United States Patent
Ilie et al.

(10) Patent No.: US 12,468,046 B2
(45) Date of Patent: Nov. 11, 2025

(54) SYSTEMS THAT SYNCHRONIZE GNSS RECEIVERS TO ENABLE DIRECTION DETECTION AND LOCALIZATION OF SPOOFING AND METHODS THEREOF

(71) Applicant: Orolia Canada Inc., Montreal (CA)

(72) Inventors: Iurie Ilie, Saint-Lazare (CA); Pierre-Marie Le Veel, Nantes (FR); Stephane Hamel, Longueuil (CA); Serge Malo, Montreal (CA); Mohamed Tamazin, Kingston (CA)

(73) Assignee: OROLIA CANADA INC., Montreal (CA)

( * ) Notice: Subject to any disclaimer, the term of this patent is extended or adjusted under 35 U.S.C. 154(b) by 338 days.

(21) Appl. No.: 18/095,343

(22) Filed: Jan. 10, 2023

(65) Prior Publication Data
US 2024/0230916 A1    Jul. 11, 2024

(51) Int. Cl.
*G01S 19/21* (2010.01)
*G01S 19/23* (2010.01)

(52) U.S. Cl.
CPC .......... *G01S 19/215* (2013.01); *G01S 19/235* (2013.01)

(58) Field of Classification Search
CPC .............................. G01S 19/215; G01S 19/235
See application file for complete search history.

(56) References Cited

U.S. PATENT DOCUMENTS

| | | |
|---|---|---|
| 10,823,842 B2 | 11/2020 | Zangvil et al. |
| 10,830,897 B2 | 11/2020 | Zangvil et al. |
| 11,086,021 B1 | 8/2021 | Zangvil et al. |
| 11,119,221 B2 | 9/2021 | Cohen et al. |
| 2019/0187294 A1* | 6/2019 | Khalajmehrabadi ........... G01S 19/215 |
| 2019/0293802 A1* | 9/2019 | Kurby ................... G01S 19/215 |

(Continued)

FOREIGN PATENT DOCUMENTS

WO    2021165087 A1    8/2021

OTHER PUBLICATIONS

International application No. PCT /CA2024/050017. The International Search Report and the Written Opinion of the International Searching Authority Dated Apr. 4, 2024.

*Primary Examiner* — William Kelleher
*Assistant Examiner* — Hailey R Le
(74) *Attorney, Agent, or Firm* — Troutman Pepper Locke LLP (57) ABSTRACT

A system, non-transitory computer-readable medium, and method include one or more clusters where each of the clusters includes two or more receivers coupled to one of two or more antennas and a computing device coupled to the two or more receivers. The computing device comprises a memory coupled to a processor which is configured to execute programmed instructions stored in the memory to: calibrate the receivers with respect to a simulated signal to compensate for any initial phase offset; compute with the calibrated receivers an estimated direction of arrival of each received geo-reference signal from the receivers each coupled to the one of the antennas; determine when any of the received geo-reference signals is a spoofing signal based on the computed estimated direction of arrival and satellite ephemeris data; execute a localization algorithm on the spoofing signal to calculate a spoofing source location; and output the spoofing location.

15 Claims, 6 Drawing Sheets

(56) References Cited

U.S. PATENT DOCUMENTS

2021/0096265 A1 4/2021 Ilie
2021/0333410 A1 10/2021 Gum

* cited by examiner

SYSTEMS THAT SYNCHRONIZE GNSS RECEIVERS TO ENABLE DIRECTION DETECTION AND LOCALIZATION OF SPOOFING AND METHODS THEREOF

FIELD

This technology relates to systems and methods for continuously synchronizing GNSS receivers to enable direction detection and localization of a spoofing attack and methods thereof.

BACKGROUND

Estimating a signal's direction of arrival (DOA) information is mainly based on calculating the phase difference of the signal received by multiple antenna elements coupled to GNSS receivers. The phase differencing can be computed based on the phase information found in the raw data of signals captured by the antenna elements and provided to the GNSS receivers.

In particular, the most common data with information about the phase is the Accumulated Doppler Range (ADR). For example, using two GNSS receivers connected to two different antennas, the phase difference ($\Delta\varphi$) of the signal coming from satellite (i) received by the two antennas can be computed as:

$$\Delta\varphi_i(t) = ADR_{receiver1}(t) - ADR_{receiver2}(t) \quad (1)$$

where;

$ADR_{receiver1}$: ADR of satellite (i) received by the first receiver.

$ADR_{receiver2}$: ADR of satellite (i) received by the second receiver.

From equation (1), the calculated phase difference $\Delta\varphi_i(t)$ contains an integer number of carrier cycles plus the carrier cycle's fractional part. The fractional part of the phase difference between the two receivers can be calculated from the carrier cycle's fractional part. The most important part is to estimate preciously fractional parts of the phase difference, and no need to solve for integer ambiguity resolution.

Unfortunately, one of the challenges of using two or more mass-market GNSS receivers to estimate the DOA of incoming signals is that these GNSS receivers are not coherent. This incoherence occurs because the GNSS receivers do not share the same clock and local oscillator, so their phase will not be aligned and thus cannot be used to calculate the phase differencing required for any DOA estimation techniques. As a result, existing mass-market GNSS receivers cannot accurately or effectively detect a direction and location of a spoofing attack.

SUMMARY

A system includes two or more receivers, each coupled to one of two or more antennas, and a spoofing detection computing device coupled to the two or more receivers. The spoofing detection computing device comprises a memory coupled to a processor, which is configured to execute programmed instructions stored in the memory to calibrate the receivers with respect to a simulated reference signal to compensate for any initial phase offset; compute with the calibrated receivers an estimated direction of arrival of each received geo-reference signal from the receivers each coupled to one of the antennas; determine when any of the received geo-reference signals is a spoofing signal based on the computed estimated direction of arrival and satellite ephemeris data; execute a localization algorithm on the spoofing signal to calculate a spoofing source location, and output the spoofing source location for the spoofing signal.

A non-transitory computer-readable medium has stored thereon instructions comprising executable code which, when executed by at least one processor, cause the processor to calibrate two or more receivers, each coupled to one of two or more antennas in one or more clusters with respect to a simulated reference signal to compensate for any initial phase offset; compute with the calibrated receivers an estimated direction of arrival of each received geo-reference signal from the receivers each coupled to the one of the antennas; determine when any of the received geo-reference signals is a spoofing signal based on the computed estimated direction of arrival and satellite ephemeris data; execute a localization algorithm on the spoofing signal to calculate a spoofing source location, and output the spoofing source location for the spoofing signal.

A method forming one or more clusters, where the forming the one or more clusters comprises coupling two or more receivers to one of two or more antennas and coupling a spoofing detection computing device to the two or more receivers. The spoofing detection computing device comprises a memory coupled to a processor, which is configured to execute programmed instructions stored in the memory to: calibrate the receivers with respect to a simulated reference signal to compensate for any initial phase offset; compute with the calibrated receivers an estimated direction of arrival of each received geo-reference signal from the receivers each coupled to one of the antennas; determine when any of the received geo-reference signals is a spoofing signal based on the computed estimated direction of arrival and satellite ephemeris data; execute a localization algorithm on the spoofing signal to calculate a spoofing source location, and output the spoofing source location for the spoofing signal.

This technology provides several advantages, including providing methods, a non-transitory computer-readable medium, and devices that effectively and inexpensively synchronize GNSS receivers to enable accurate direction detection and localization of a spoofing attack. Examples of this technology allow low-cost mass-market receivers to detect and estimate the direction of a spoofing attack(s). Additionally, examples of this technology utilize the power of the Internet of Things (IoT) and Cloud computing technologies to determine the locations of spoofers. Accordingly, examples of this technology provide a low-cost spoofing detection solution, when compared to prior expensive coherent solutions, by re-using existing infrastructures of GNSS antennas and receivers currently deployed in the field for this detection and direction estimate of spoofing source(s) and localizing one or more spoofer source(s) based on clustering and use of IoT and cloud computing technologies.

DETAILED DESCRIPTION

Figure 1:
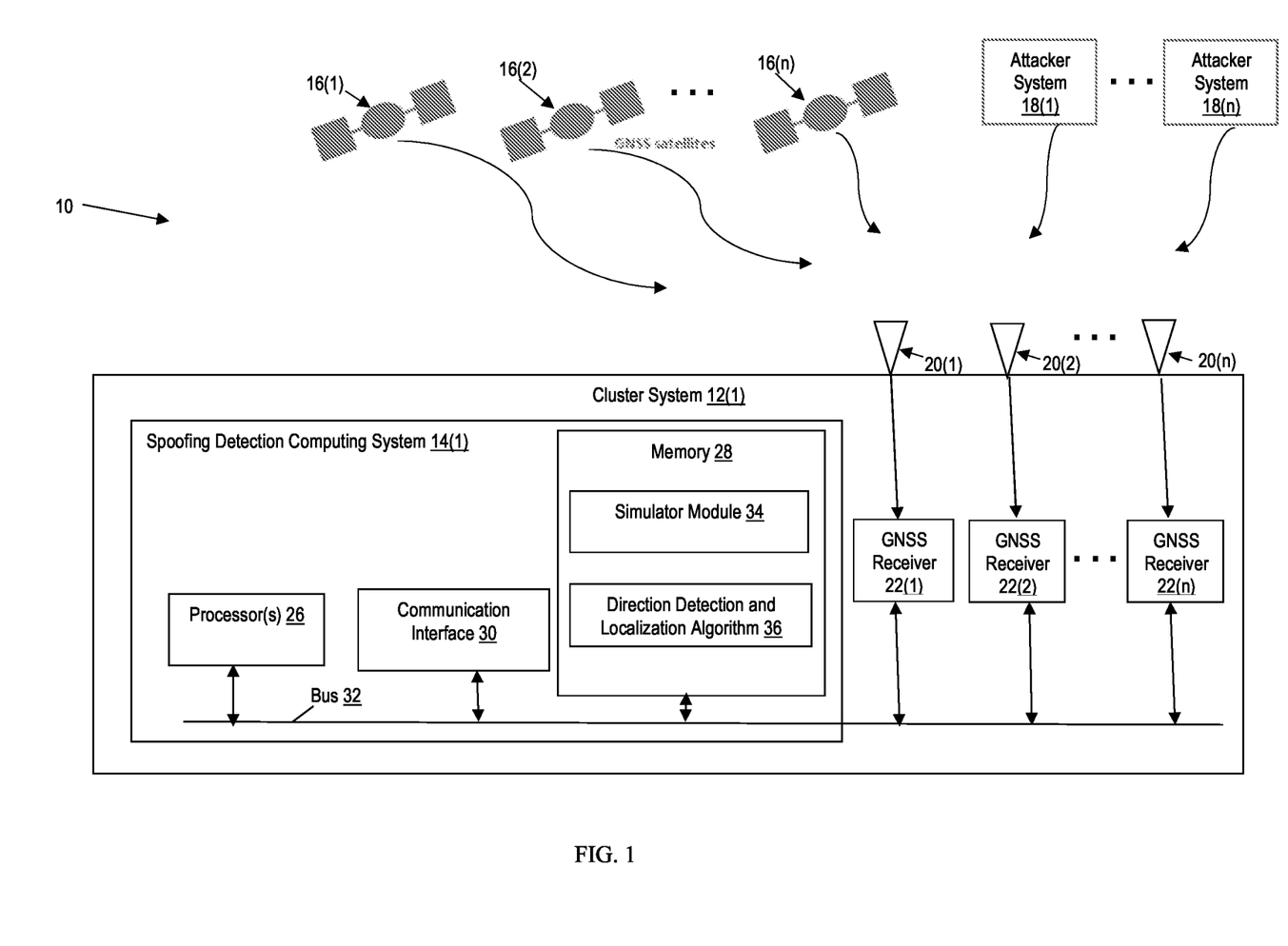
FIG. 1 is a block diagram of an exemplary environment with an example of a cluster system with a spoofing detection computing system.
Figure 2A:
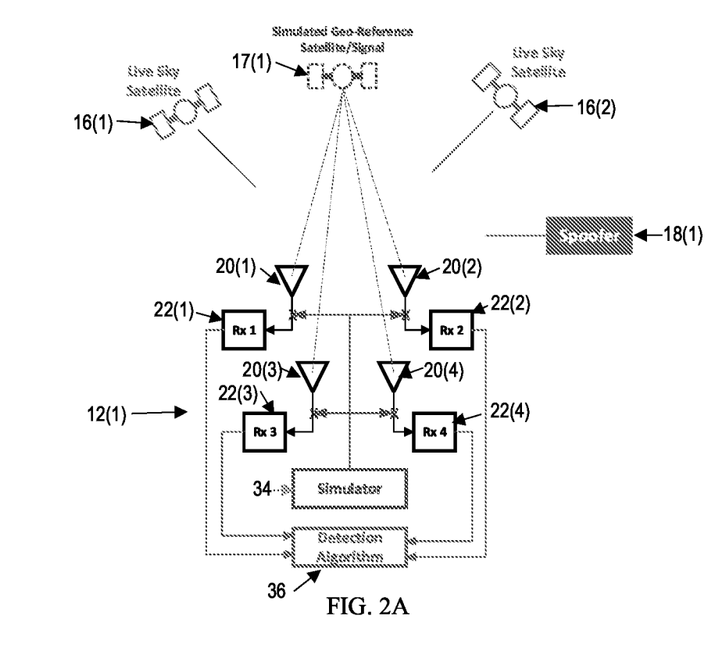
FIG. 2A is a functional block diagram of a portion of the example of the cluster system shown in FIG. 1.
Figure 2B:
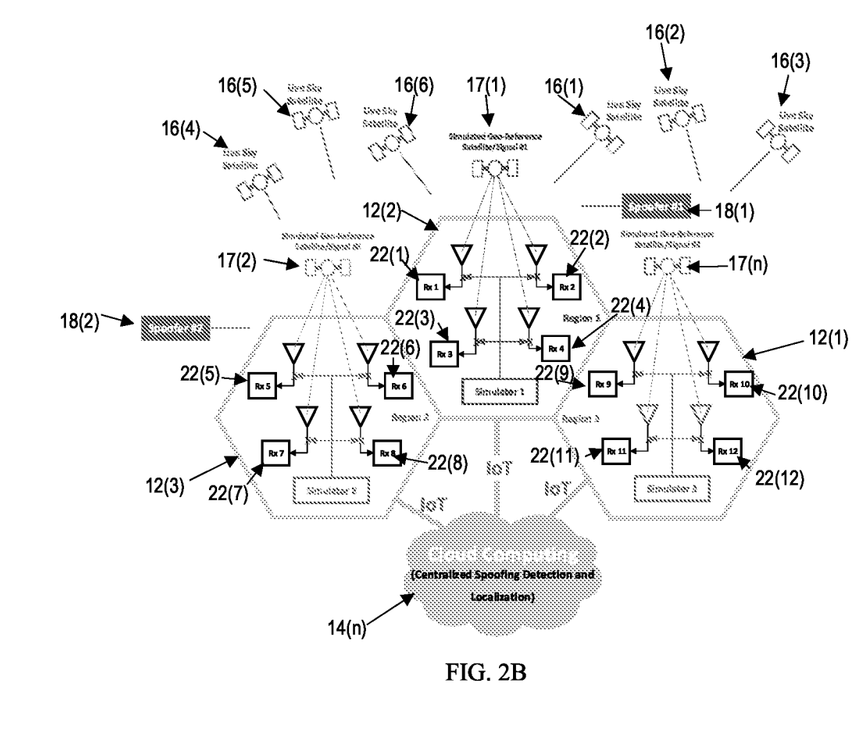
FIG. 2B is a functional block diagram of an example of a plurality of cluster systems coupled to a cloud-based spoofing detection computing system.

An environment 10 with an example of a cluster system 12(1) with a spoofing detection computing system 14(1) is illustrated in FIGS. 1 and 2A. In this example, the environment 100 includes the cluster system 12(1) with the spoofing detection computing system 14(1), GNSS satellites 16(1)-16(n), a simulated geo-reference satellite 17(1), and an attacker system 16(1), although the environment can other types and/or numbers of other systems, devices, components, and/or other elements in other configurations, such as with a cloud computing based spoofing detection computing system 14 (n) and multiple cluster systems 12(1)-12(3) as illustrated in FIG. 2B by way of example. This technology provides several advantages, including methods, non-transitory computer-readable mediums and devices that effectively and inexpensively synchronize GNSS receivers to enable accurate direction detection and localization of a spoofing attack.

Referring more specifically to FIGS. 1 and 2, the cluster system 12(1) includes the spoofing detection computing system 14(1), antennas 20(1)-20(4), and GNSS receivers 22(1)-22(4), although other numbers and/or types of cluster systems with other types and/or numbers of other systems, devices, components, and/or other elements in other configurations may be used, such as a multiple cluster system 12(1)-12(3) with a cloud computing based spoofing detection computing system 14(n) as illustrated in FIG. 2B by way of example. In these examples, the cluster systems 12(2)-12(n) have the same structure and configuration for operation as cluster system 12(1) as illustrated and described by way of the examples herein, although one or more may have other structures and/or operational configurations.

The spoofing detection computing system 14(1) includes at least one processor 26, a memory 28, and a communication interface 30, although the spoofing detection computing system 14(1) can comprise other types and/or numbers of systems, devices, components, and/or other elements in other configurations. In this example, one spoofing detection computing system 14(1) is shown, although other numbers and configurations may be used in other examples. For example, in FIG. 2B, the spoofing detection computing system 14(n) is cloud-based but otherwise is the same in structure and configuration for operation as the spoofing detection computing system 14(1) illustrated and described by way of the examples herein.

The processor 26 of the spoofing detection computing system 14(1) may execute programmed instructions stored in the memory for the any number of the functions or other operations illustrated and described by way of the examples herein. The processor 26 of the spoofing detection computing system 14(1) may include one or more CPUs or other processors with one or more processing cores, for example, although other types of processor(s) can also be used.

The memory 28 of the spoofing detection computing system 14(1) stores these programmed instructions for one or more aspects of the present technology as illustrated and described herein, although some or all of the programmed instructions could be stored elsewhere. By way of example, one or more aspects of the technology may be executed in a cloud computing environment by one or cloud computing servers. A variety of different types of memory storage devices, such as random access memory (RAM), read-only memory (ROM), hard disk (HDD), solid-state drives (SSD), flash memory, or another computer-readable medium which is read from and written to by a magnetic, optical, or other reading and writing system that is coupled to the processor(s) 26, can be used for the memory 28.

Accordingly, the memory 28 of the spoofing detection computing system 14(1) can store application(s) that can include executable instructions that, when executed, cause the spoofing detection computing system 14(1) to perform actions, such as transmit, receive, or otherwise process signals related to navigation or other positioning and to detect and identify a direction and location of spoofing attacks, as illustrated and described by way of the examples herein with reference to FIGS. 1-5. The application(s) can be implemented as modules or components of other application(s). Further, the application(s) can be implemented as operating system extensions, modules, plugins, or the like. In this example, the memory 28 includes a simulator module 34 and a direction detection and localization algorithm 36, although the memory 28 may have other types and/or numbers of other algorithms, modules, programmed instructions, and/or other data.

The simulator module 34 includes programmed instructions to generate a simulated geo-reference signal to enable synchronization of the phase of the GNSS receivers 22(1)-22(n) as well as execute other operations and/or functions as illustrated and described by way of the examples herein. Additionally, in this particular example, the direction detection and localization algorithm 36 includes programmed instructions to determine the direction and a location of a spoofing attack as well as execute other detection and localization algorithms as illustrated and described by way of the examples herein. In other examples, the simulator module 34 may comprise hardware configured to generate the simulated geo-reference signal.

The communication interface 30 of the spoofing detection computing system 14(1) operatively couples and communicates between the spoofing detection computing system 14(1) and the GNSS receivers 22(1)-22(n) coupled to corresponding ones of the antennas 20(1)-20(n) which are all coupled together by one or more communication network(s), although other types and/or numbers of connections and/or configurations to other devices and/or elements can be used. By way of example only, the communication network(s) can include local area network(s) (LAN(s)) or wide area network(s) (WAN(s)), and/or wireless networks by way of example only, although other types and/or numbers of protocols and/or communication networks can be used.

The antennas 20(1)-20(n) and the GNSS receivers 22(1)-22(n) are coupled together in various configurations, such as in one cluster system 12(1), as shown in FIG. 2A or in multiple cluster systems 12(1)-12(3) as shown in FIG. 2B by way of example, although other configurations may be used, such as other numbers of clusters. Each of the antennas 20(1)-20(n) and corresponding ones of the GNSS receivers 22(1)-22(n) are configured to capture signals from GNSS satellites 12(1)-12(n) and generate raw data from those GNSS or other geo-reference signals when navigation or other positioning is to be determined, although other types of receivers with other components and/or elements in other configurations may be used. In this example, the GNSS receivers 22(1)-22(n) do not share the same clock, and local oscillator and a result are incoherent with respect to phase without execution of examples of this technology.

Additionally, in this example, the GNSS satellites 16(1)-16(n) and the simulated geo-reference satellite 17(1) are illustrated, although other types and/or numbers of satellites and/or other geo-reference transmitters or other sources of geo-reference signals may be used, such as simulated geo-reference satellites 17(1)-17(n) shown in FIG. 2B. The GNSS satellites 16(1)-16(n) and the simulated geo-reference satellite 17(1) are each configured to broadcast a GNSS or other geo-reference signal, which can be received and processed by the spoofing detection computing system 14(1) for determining a direction and localization of a spoofing attack.

Further, in this example, the attacker system 18(1) includes at least one processor, a memory, a communication interface, and a GNSS receiver which includes an antenna, which is coupled together by a bus or other communication link, although the attacker system 18(1) can include other types and/or numbers of systems, devices, components, and/or other elements in other configurations. The attacker system 18(1) may receive a signal and may generate a GNSS spoofing signal. Additionally, other types and/or numbers of attacker systems may be in the environment 10, such as attacker systems 18(1) and 18(2), as shown in FIG. 2B, by way of example only, have the same structure and configuration for operation as the attacker system 18(1), although one or more may have other structures and/or may be configured for operation in other manners.

Although in this exemplary environment 10 the cluster system 12(1) with the spoofing detection computing system 14(1), the antennas 20(1)-20(n), and the GNSS receivers 22(1)-22(n) are illustrated and described, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

Portions of all of the examples of the technology illustrated and described herein may also be embodied as one or more non-transitory computer-readable media having instructions stored thereon for one or more aspects of the present technology. The instructions in some examples include executable code that, when executed by the processor of the spoofing detection computing system 14(1), causes the processor to carry out steps necessary to implement the methods of the examples of this technology that are illustrated and described herein.

Exemplary methods for synchronizing GNSS receivers to enable direction detection and localization of a spoofing attack will now be described by way of various examples with reference to FIGS. 1-5. In this example, the method will be described with respect to cluster system 12(1), although the same method may be utilized in and/or with each of the other cluster systems 12(2)-12(n).

Figure 3:
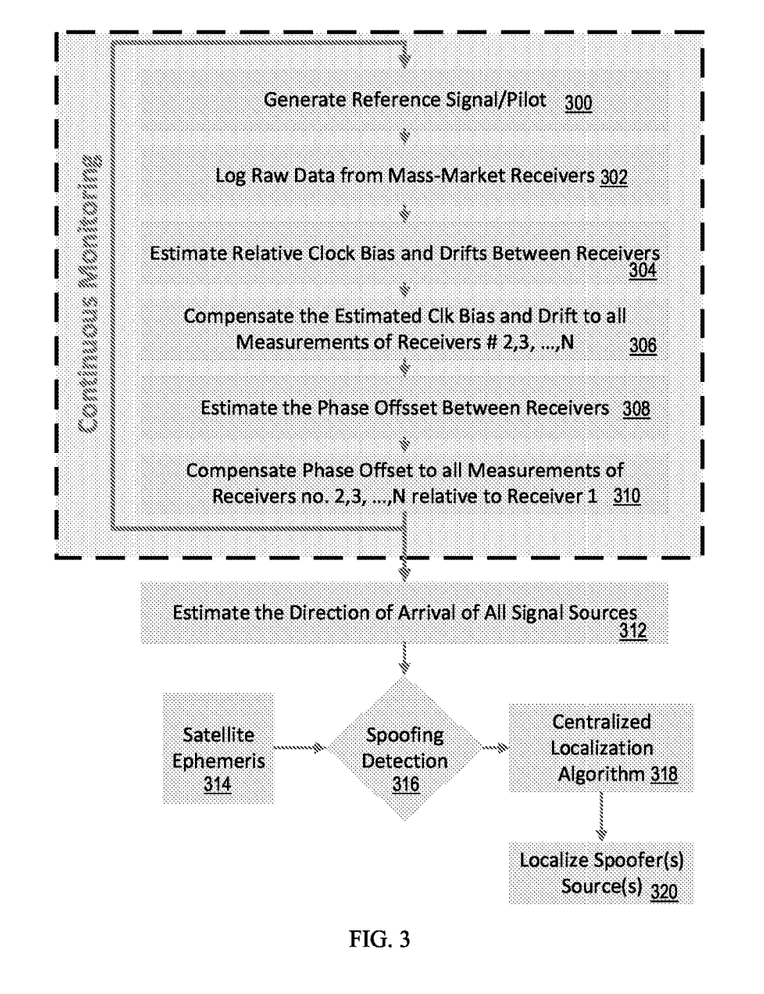
FIG. 3 is a flowchart of an example of a method for synchronizing GNSS receivers to enable direction detection and localization of a spoofing attack.

In steps, 300-310, the spoofing detection computing system 14(1) calibrates the GNSS receivers 22(1)-22(4) in cluster system 12(1) with respect to a simulated geo-reference signal to compensate for any initial phase offset. In this example, the spoofing detection computing system 14(1) executes this calibration continuously to maintain the accuracy of the detection and localization of any spoofing attacks, although other types of calibration cycles may be used.

In this example in step 300, the spoofing detection computing system 14(1) executes the simulator module 34 to generate a simulated geo-reference signal which is transmitted to each of the receivers 22(1)-22(n) in the cluster system 12(1), although other types of reference signals from other sources may be used.

In step 302, the spoofing detection computing system 14(1) logs raw data received from each of the GNSS receivers 22(1)-22(n) in response to the transmitted simulated geo-reference signal. As described earlier, since the GNSS receivers the GNSS receivers 22(1)-22(n) do not share the same clock and local oscillator, their phase would not be expected to be aligned, and thus, without these examples of the claimed technology, could not be used to accurately calculate the phase differencing required for any DOA estimation techniques.

In step 304, the spoofing detection computing system 14(1) estimates relative clock bias and drift between the GNSS receivers 22(1)-22(4). By way of example, the spoofing detection computing system 14(1) may estimate clock bias from measurements of two of the satellites 16(1)-16(n) in a single difference observation equation combination, although other manners for estimating relative clock bias and drift between the GNSS receivers 22(1)-22(n) may be used. The relative clock bias between two or more of the GNSS receivers 22(1)-22(4) is calculated based on the pseudo-range difference of the generated reference signal/pilot. Moreover, the relative clock drift between two or more receivers is determined based on the rate of ADRs change or the difference in doppler frequency between two or more receivers relative to the first receiver.

In step 306, the spoofing detection computing system 14(1) applies the determined estimated compensation for this estimated clock bias and drift to all measurements of the GNSS receivers 22(1)-22(4).

Figure 4:
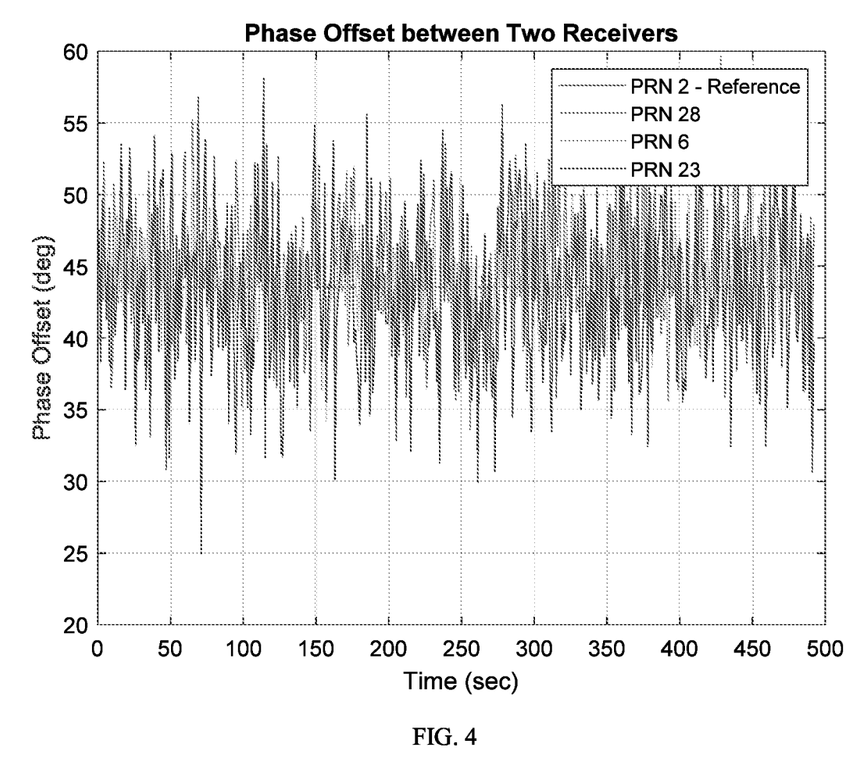
FIG. 4 is a graph of an exemplary phase offset between two GNSS receivers.

In step 308, the spoofing detection computing system 14(1) determines an estimated phase offset between the GNSS receivers 22(1)-22(n) based on the logged raw data. For example, when the simulated reference signal is received at the exact antenna location (virtually), the expected phase difference between the fractional part of two or more ADRs is ZERO degrees. This phase offset will differ from ZERO as the receivers are not coherent. An example of the phase offset between two of the GNSS receivers 22(1)-22(n), which are not coherently aligned, is shown in FIG. 4. In this example shown in FIG. 4, the average determined estimated phase offset between the two of the GNSS receivers 22(1)-22(n) is around 44°.

Figure 5:
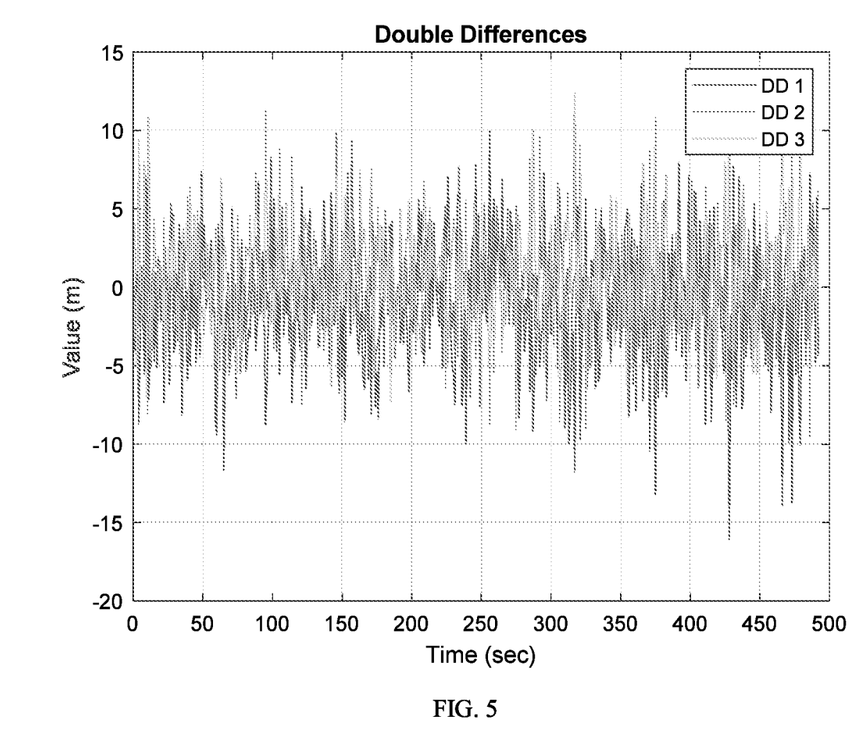
FIG. 5 is a graph of an example of double differences illustrating that the GNSS receivers are coherently aligned.

In step 310, the spoofing detection computing system 14(1) compensates for the phase offset to all measurements of the GNSS receivers 22(2)-22(4) relative to GNSS receiver 22(1). These difference values will be applied as a correction factor to all phase measurements from the GNSS receivers 22(2)-22(4) used in computations. The graph in FIG. 5 shows that those double differences calculations have been examined to verify that the GNSS receiver 22(1) and one of the GNSS receivers 22(2)-22(4) are coherently aligned, and the other ones of the GNSS receivers 22(2)-22(4) will have similar corrective compensations.

In step 312, the spoofing detection computing system 14(1) estimates the direction of arrival from raw data obtained from the receipt of signals from one or more of the satellite or simulated geo-reference sources 16(1)-16(n) and 17(1) by antennas 20(1)-20(4) coupled to corresponding ones of GNSS receivers 22(1)-22(4) in this example. The phase differences and angle of arrival will be different for live sky satellite or simulated geo-reference sources 16(1)-16(n) and 17(1), where all the signals received a spoofer at an attacker system 18(1) will come from one direction.

In step 314, the spoofing detection computing system 14(1) satellite ephemeris data which is a table or database of positions of satellite or simulated geo-reference sources 16(1)-16($n$) and 17(1) is retrieved from memory 28 or from other sources in other locations.

In step 316, the spoofing detection computing system 14(1), the direction detection and localization algorithm 36 is executed to determine the direction of each of the received signals from antennas 20(1)-20(4) coupled to corresponding ones of GNSS receivers 22(1)-22(4) as well as from the attacker system 18(1). This can, for example, be detected by comparing the estimated direction of the received signals with the visible satellites' expected arrival direction based on the satellite's ephemeris and antennas' location and orientation.

In step 318, the spoofing detection computing system 14(1), the direction detection and localization algorithm 36 are executed to determine an estimated location of the source of the spoofing attack, such as from the attacker system 18(1) by way of example.

In step 320, the spoofing detection computing system 14(1) provides an identification of the localized source of the spoofing attack from attacker system 18(1) in this example, although other numbers of spoofing attacks may be detected and localized, such as one by one or more of attacker systems 18(2)-18($n$) as well by way of example.

As illustrated in the example shown in FIG. 2B, examples of this technology may be easily made infinitely scalable by using the power of cloud computing and IoT technologies with a cloud-based spoofing detection computing system 17($n$). For example, as shown in FIG. 2B, a wider area may be covered with several cluster systems 12(1)-12(3), which are each coupled to and managed for this direction detection and localization by the cloud computing-based spoofing detection computing system 17($n$) in the same manner as described above with reference to FIG. 2A, except as otherwise illustrated and described by way of the examples herein.

In this example in shown in FIG. 2B, each cluster system 12(1)-12(3) will provide a different reference signal/pilot to the mass-market GNSS receivers 22(1)-22(12) inside each of the cluster systems 12(1)-12(3). Once the corresponding receivers 22(1)-22(12) are coherently aligned inside each of the cluster systems 12(1)-12(3), the cluster systems 12(1)-12(3) can detect and estimate the direction of the spoofing attack within the cluster area. The raw logs of each of the cluster systems 12(1)-12(3) are logged wirelessly through the IoT technology and processed centralized using the cloud computing-based spoofing detection computing system 14($n$). The cloud computing-based spoofing detection computing system 14($n$) centrally logs coming from each geo-location cluster 12(1)12-(3) to localize one or more spoofer sources from the attacker systems 18(1) and 18(2) in this example. Additionally, in this example, the cluster systems 12(2)-12(3) are configured to operate in the same manner as described earlier with reference to cluster system 12(1) and the cloud computing-based spoofing detection computing system 14($n$) is configured to operate in the same manner as spoofing detection computing system 14(1), although in other examples other configurations for operations may be used.

Experimental Results:

In FIGS. 4 and 5, experimental results with two of the GNSS receivers 22(1)-22($n$) of the cluster system 12(1) are illustrated and as described earlier. In this example, a pilot signal comprising a pseudorandom noise-like signal was used that the two of the GNSS receivers 22(1)-22($n$) can track. In this example, the pilot signal was any PRN code that is not deployed in space or can be from different constellations. Also, in this and other examples, the pilot signal can be added using a conductive or radiated way by way of example. The conductive way is based on generating the pilot using a GNSS simulator module 34 and combining the RF output of the simulator module 34 with the RF output of antennas 20(1)-20(4). However, in other examples the radiating method can be established by installing a radiation antenna in the middle of all other antennas 20(1)-20(4).

Accordingly, as illustrated and described by the examples herein, this technology provides several advantages, including methods, non-transitory computer-readable medium, and devices that effectively and inexpensively synchronize GNSS receivers to enable accurate direction detection and localization of a spoofing attack. Examples of this technology allow the use of low-cost mass-market receivers to detect and estimate the direction of the spoofing attack(s). Additionally, examples of this technology utilize the power of the Internet of Things (IOT) and Cloud computing technologies to localize the locations of spoofers. Accordingly, examples of this technology provide a low-cost spoofing detection solution, when compared to prior expensive coherent solutions, by re-using existing infrastructures of GNSS antennas and receivers currently deployed in the field for this detection and direction estimate of spoofing source(s) and localizing one or more spoofers based on clustering and use of IoT and cloud computing technologies.

Having thus described the basic concept of the invention, it will be rather apparent to those skilled in the art that the foregoing detailed disclosure is intended to be presented by way of example only and is not limiting. Though not expressly stated herein, various alterations, improvements, and modifications will occur and are intended for those skilled in the art. These alterations, improvements, and modifications are intended to be suggested hereby and are within the spirit and scope of the invention. Additionally, the recited order of processing elements or sequences, or the use of numbers, letters, or other designations, is not intended to limit the claimed processes to any order except as may be specified in the claims. Accordingly, the invention is limited only by the following claims and equivalents thereto.

What is claimed is:
1. A system comprising:
one or more clusters wherein each of the clusters comprises:
two or more receivers, each coupled to one of two or more antennas;
a spoofing detection computing device coupled to the two or more receivers, the spoofing detection computing device comprising a memory coupled to a processor which is configured to execute programmed instructions stored in the memory to:
calibrate the receivers with respect to a simulated reference signal to compensate for any initial phase offset;
compute with the calibrated receivers an estimated direction of arrival of each received geo-reference signal from the receivers each coupled to the one of the antennas;
determine when any of the received geo-reference signals is a spoofing signal based on the computed estimated direction of arrival for each of the received geo-reference signals and satellite ephemeris data, wherein the computed estimated direction of arrival for all of the received geo-reference signals for the spoofing signal will come from one direction;

execute a localization algorithm on the spoofing signal to calculate a spoofing source location; and output the spoofing source location for the spoofing signal.

2. The system as set forth in claim 1 wherein for the calibrate the receivers, the programmed instructions stored in the memory further comprise additional programmed instructions to:

generate and provide the simulated reference signal to each of the receivers;

log data for the provided simulated reference signal from each of the receivers;

determine an estimated phase offset between the receivers based on the logged data; and compensate for the determined phase offset relative to one of the receivers in all other ones of the receivers.

3. The system as set forth in claim 2 wherein for the calibrate the receivers, the programmed instructions stored in the memory further comprise additional programmed instructions to:

determine an estimated clock bias and drifts between the receivers; and compensate for the determined clock bias and the drifts between the receivers before the determine the estimated phase offset between the receivers.

4. The system as set forth in claim 1 wherein the calibrate the receivers with respect to the simulated reference is configured to be continuously executed.

5. The system as set forth in claim 1 wherein the one or more clusters comprise two or more of the clusters.

6. A non-transitory computer readable medium having stored thereon instructions comprising executable code which when executed by at least one processor, cause the processor to:

calibrate two or more receivers each coupled to one of two or more antennas in one or more clusters with respect to a simulated reference signal to compensate for any initial phase offset;

compute with the calibrated receivers an estimated direction of arrival of each received geo-reference signal from the receivers each coupled to the one of the antennas;

determine when any of the received geo-reference signals is a spoofing signal based on the computed estimated direction of arrival for each of the received geo-reference signals and satellite ephemeris data, wherein the computed estimated direction of arrival for all of the received geo-reference signals for the spoofing signal will come from one direction;

execute a localization algorithm on the spoofing signal to calculate a spoofing source location; and output the spoofing source location for the spoofing signal.

7. The non-transitory computer readable medium as set forth in claim 6 wherein for the calibrate the receivers, the executable code further comprises additional executable code which when executed by the processor, cause the processor to:

generate and provide the simulated reference signal to each of the receivers;

log data for the provided simulated reference signal from each of the receivers;

determine an estimated phase offset between the receivers based on the logged data; and compensate for the determined phase offset relative to one of the receivers in all other ones of the receivers.

8. The non-transitory computer readable medium as set forth in claim 7 wherein for the calibrate the receivers, the executable code further comprises additional executable code which when executed by the processor, cause the processor to:

determine an estimated clock bias and drifts between the receivers; and compensate for the determined clock bias and the drifts between the receivers before the determine the estimated phase offset between the receivers.

9. The non-transitory computer readable medium as set forth in claim 6 wherein the calibrate the receivers with respect to the simulated reference is configured to be continuously executed.

10. The non-transitory computer readable medium as set forth in claim 6 wherein the one or more clusters comprise two or more of the clusters.

11. A method comprising:

forming one or more clusters, wherein the forming the one or more clusters comprises:

coupling two or more receivers to one of two or more antennas; and coupling a spoofing detection computing device to the two or more receivers, the spoofing detection computing device comprising a memory coupled to a processor which is configured to execute programmed instructions stored in the memory to:

calibrate the receivers with respect to a simulated reference signal to compensate for any initial phase offset;

compute with the calibrated receivers an estimated direction of arrival of each received geo-reference signal from the receivers each coupled to the one of the antennas;

determine when any of the received geo-reference signals is a spoofing signal based on the computed estimated direction of arrival for each of the received geo-reference signals and satellite ephemeris data, wherein the computed estimated direction of arrival for all of the received geo-reference signals for the spoofing signal will come from one direction;

execute a localization algorithm on the spoofing signal to calculate a spoofing source location; and output the spoofing source location for the spoofing signal.

12. The method as set forth in claim 11 wherein for the calibrate the receivers, the executable code further comprises additional executable code which when executed by the processor, cause the processor to:

generate and provide the simulated reference signal to each of the receivers;

log data for the provided simulated reference signal from each of the receivers;

determine an estimated phase offset between the receivers based on the logged data; and compensate for the determined phase offset relative to one of the receivers in all other ones of the receivers.

13. The method as set forth in claim 12 wherein for the calibrate the receivers, the executable code further comprises additional executable code which when executed by the processor, cause the processor to:

determine an estimated clock bias and drifts between the receivers; and compensate for the determined clock bias and the drifts between the receivers before the determine the estimated phase offset between the receivers.

14. The method as set forth in claim 11 wherein the calibrate the receivers with respect to the simulated reference is configured to be continuously executed.

15. The method as set forth in claim 11 wherein the one or more clusters comprise two or more of the clusters.

* * * * *